United States Patent [19]

Lautzenhiser

[11] Patent Number: 4,657,228
[45] Date of Patent: Apr. 14, 1987

[54] GAS-ACTUATED SHOCK ABSORBER FOR AIRCRAFT

[76] Inventor: John L. Lautzenhiser, Highway 69 North, Box 87, Nobel, Ontario, Canada, P0G 1G0

[21] Appl. No.: 705,100
[22] Filed: Feb. 25, 1985
[51] Int. Cl.⁴ .............................................. F16F 5/00
[52] U.S. Cl. ............................. 267/64.15; 188/322.14; 188/322.19
[58] Field of Search ............... 188/269, 322.19, 322.21, 188/322.14, 322.18, 298; 267/64.15, 64.17, 64.18

[56] References Cited

U.S. PATENT DOCUMENTS

| | | |
|---|---|---|
| 491,794 | 2/1893 | Barker ................................. 188/298 |
| 1,528,918 | 3/1925 | Flader . |
| 1,780,531 | 11/1930 | Messier . |
| 2,055,248 | 9/1936 | Cautley . |
| 2,139,192 | 12/1938 | Krekel . |
| 2,873,964 | 2/1959 | Hamilton ........................... 267/64.15 |
| 3,062,330 | 11/1962 | Lyon . |
| 3,140,084 | 7/1964 | Schmidt . |
| 3,149,830 | 9/1964 | Broadwell . |
| 3,263,986 | 8/1966 | Tollar . |
| 3,888,436 | 6/1975 | Sealey . |
| 3,937,450 | 2/1976 | Bauer . |
| 4,004,762 | 1/1977 | Jenkins . |
| 4,007,894 | 2/1977 | Hartel . |
| 4,062,507 | 12/1977 | Felder . |
| 4,064,977 | 12/1977 | Taylor . |
| 4,265,344 | 5/1981 | Taylor ....................... 188/322.19 X |
| 4,291,788 | 9/1981 | Kato ............................. 267/64.15 X |
| 4,381,857 | 5/1983 | Cook . |

Primary Examiner—Duane A. Reger
Attorney, Agent, or Firm—Wendell E. Miller

[57] ABSTRACT

An air-actuated shock absorber (10) is provided for aircraft of the type generally known as ultralight, and for aircraft of the light utility type. The shock absorber (10) is fabricated from aluminum tubing and plastic. The head-end volume (72) is charged by a hand-actuated tire pump; and damping is provided by aspirating the rod-end volume (70) and by restricting the fluid flow path through which the rod-end volume (70) is aspirated.

13 Claims, 2 Drawing Figures

GAS-ACTUATED SHOCK ABSORBER FOR AIRCRAFT

BACKGROUND OF THE INVENTION

1. Field of the Invention

The present invention relates generally to shock absorbers for aircraft. More particularly, the present invention relates to gas-actuated shock absorbers for use in the landing gear of pleasure-soaring, or light utility, aircraft.

2. Description of the Prior Art

In the early days of aviation it was common for flying enthusiasts to design and fabricate their own airplanes. Later, kits were available for those who desired to fly but did not have the funds to purchase factory made airplanes; and all through the ensuing years there have been those who have built their own airplanes.

More recently a new class of aircraft has developed which is called "ultralight." Ultralight aircraft started with the bare necessities that would produce flight and carry the pilot and have evolved to a more sophisticated pleasure aircraft. Ultralight airplanes may be purchased completely manufactured or in kit form.

An ultralight airplane may have a wing loading in the vicinity of three pounds per square foot, weigh two hundred and fifty pounds, or so, use an engine of thirty horsepower, or so, have a cruising speed of about sixty miles per hour, and may carry a load, including the pilot, of approximately two hundred pounds.

An even more recent development is a category of aircraft which is intermediate of ultralights and general aviation. Aircraft in this new category weigh fifty to several hundred pounds, more than ultralights, have a cruising speed of ten to seventy miles per hour, or so, more than that of ultralights, and have an engine that has ten to seventy more horsepower than ultralights; and these aircraft will have light utility applications as well as pleasure.

The landing gears of ultralight aircraft have been constructed of a heat-treated material. Little, if any provision has been made to soften landings; although some ultralights have used rubber wrapped around separating members of the landing gear to soften the landings.

There have been several problems with providing shock absorbing struts for ultralights; and the same problems will exhist to almost the same extent with this new, slightly larger, and slightly more expensive type of aircraft.

Ultralights are a pleasure-soaring type of aircraft. They are designed and built for the person who enjoys going up for an hour or two, one or two days a week, when the weather is good.

Since the wing loading is very low, and both the cruising and landing speeds are low, the gust loading is high. Thus, there are many days, in most parts of the world, that the wind is too strong for either ultralights or this new, and slightly larger, aircraft.

Also, with a quite limited cruising speed, it is not practical to attempt to fly long distances; because either a head wind may make ground speed extremely slow; or, by the time the pilot arrives at his destination, the wind velocity may have increased and landing may be hazardous, or flying without instruments and an instrument rating may not be safe.

Therefore, a first problem in designing a shock absorber for these two types of aircraft is that it is necessary to keep the selling price within an acceptable range. Thus, price rules out standard types of aircraft shock absorbers.

A second problem is that of weight combined with price. With all aircraft, weight is a primary concern. However, when it is necessary to consider both weight and cost, the problem intensifies.

One way to eliminate a part of the weight is to eliminate the weight of the oil; and instead, provide an air, or gas, spring, and then also provide shock-absorbing chamber by restricting gas, or air, movement from one chamber to another. Flader, in U.S. Pat. No. 1,528,918, describes such a gas-operated shock absorber for aircraft.

It has been a problem to pressurize aircraft shock struts of the type using a gas charge with oil, and of the type using only a gas. Cautley, in U.S. Pat. No. 2,055,248, disclosed a hand pump for increasing the pressure of air from a standard air compressor to the pressure that is required for the shock strut.

More recently, it has been standard practice to pressurize aircraft shock absorbers with an inert gas from a pressurized bottle.

However, the owner of an ultralight cannot be expected to have either a booster pump, as described by Cautley, or a pressurized bottle of inert gas to service his aircraft.

Thus, the prior art does not teach the construction of a shock absorber that meets the requirements of: low cost, light weight, and low charging pressure.

SUMMARY OF THE INVENTION

In the present invention, a shock absorber is provided for the landing gear of ultralight aircraft, and for aircraft of the light utility type.

The shock absorber includes a cylinder barrel of aluminum tubing in which the bore of the tubing is used as the cylinder bore without further finishing except for anodizing.

A cylinder head of plastic and a cylinder bearing of plastic are both inserted into the cylinder barrel, and are attached to the cylinder barrel by means of a plurality of circumferentially spaced and radially disposed blind rivets.

The piston rod is a piece of aluminum tubing that is used without any machining operations to provide a smoother finish.

A piston of plastic includes an attaching portion that is inserted into the piston rod; and the piston is attached to the piston rod by a plurality of circumferentially spaced and radially disposed blind rivets.

The piston and one end of the piston rod are both inserted into the cylinder barrel; and the piston rod extends outwardly through a rod bore in the cylinder bearings.

A first O-ring is used as a seal between the cylinder barrel and the cylinder head, a second O-ring is used as a seal between the piston and the cylinder barrel, and a third O-ring, which is inserted into the cylinder barrel intermediate of the cylinder bearing and the cylinder head, serves as a bumper to minimize shock of the piston extending to the maximum stroke length.

There is no seal between the rod bore and the piston rod; and there is no seal between the bearing and the cylinder bore, thereby reducing the cost of providing and fitting seals in these two places.

In addition, since no seal is used around the piston rod, there is no danger of seal damage due to rock nicks on the piston rod; and so a piece of aluminum tubing makes a suitable piston rod.

The head end of the shock absorber is charged with air from a tire pump; and the required pressure can be attained with a hand-actuated tire pump, a foot-actuated tire pump, or a battery-actuated tire pump.

Air pressure in the rod end of the shock absorber is used to provide damping. Instead of providing complicated valving in order to limit the damping force, the maximum damping force is limited by aspirating the rod end of the shock absorber to the atmosphere; and this aspiration is restricted by a restricted flow path.

The shock absorber acts as an air spring by moving the piston rod inwardly against the compressed air in the head end of the shock absorber; so the volume in the rod end of the cylinder is increased. Since the volume in the rod end of the cylinder is aspirated to atmospheric pressure, the damping force of the cylinder is limited to atmospheric pressure, multiplied by the area between the piston rod and the cylinder bore.

So, no matter how fast the piston rod is moved inwardly during a hard landing, the damping force, that is added to the spring force of the compressed air, is precisely limited, thereby eliminating the necessity of expensive valving devices to control the damping force.

It can be appreciated that the restriction of air entering the aspirated volume can be varied over fairly wide limits without changing the damping force that adds to the spring force at piston velocities that are encountered in a rough landing. Thus, precision manufacturing tolerances, for controlling the damping force, are not necessary.

Further, the damping of the shock absorber in the direction of air exiting from the shock absorber can be varied over a relatively wide limit and still avoid repeated bounding of the aircraft; because highly controlled damping is achieved in the direction of piston movement inwardly as the aircraft hits the ground.

The fact that the damping on closing of the shock absorber is limited by atmospheric pressure, without regard to the speed of closing, allows the use of the diametral clearance between the piston rod and rod bore to be used for restricting aspiration of the rod-end volume, thereby providing a further cost advantage.

The shock absorber is protected from contamination entering the shock absorber, between the piston rod and rod bore, and between the cylinder bearing and cylinder bore, by a filter disk of plastic foam. The disk of plastic foam is retained between the cylinder bearing and a plastic disk that is snapped into a groove in the cylinder barrel.

BEST MODE FOR CARRYING OUT THE INVENTION

Figure 1:
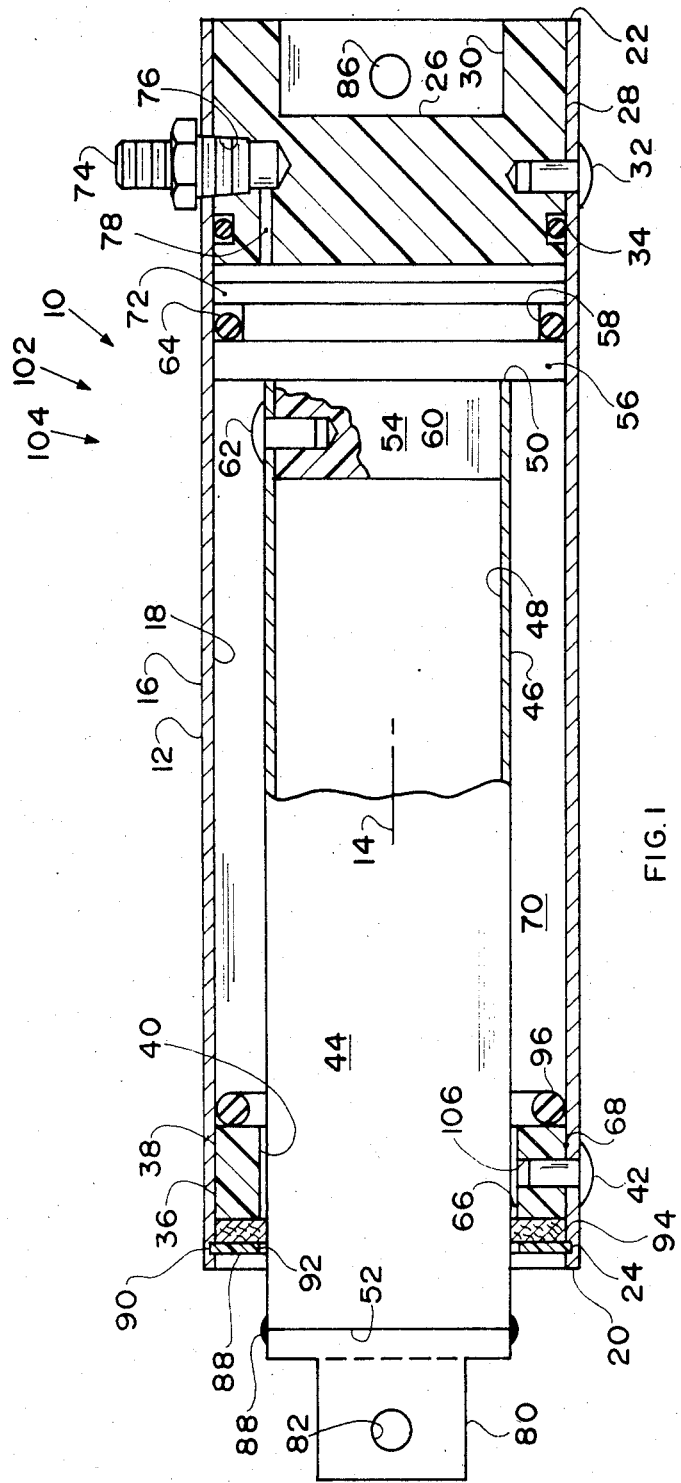
FIG. 1 is a longitudinal cross section of a preferred embodiment of the shock absorber of the present invention.

Referring now to FIG. 1, a gas-actuated shock absorber 10 includes a cylinder barrel, or first tubular part, 12 of aluminum tubing that is disposed circumferentially around a longitudinal axis 14. The cylinder barrel 12 includes a cylindrical outside surface 16, a cylinder bore 18 that is cylindrical in shape, a first end 20, a second end 22, and an internal groove, or circumferential groove, 24 that is disposed proximal to the first end 20.

A cylinder head, or first plastic part, 26 includes an outside diameter 28 that is inserted into the cylinder bore 18, and a counterbore 30 that reduces the weight of the cylinder head 26.

The cylinder head 26 is attached to the cylinder barrel 12 by a plurality of blind rivets 32 that are circumferentially spaced and that are radially disposed; and an O-ring 34 provides a gas-tight seal between the cylinder head 26 and the cylinder bore 18 of cylinder barrel 12.

A cylinder bearing, or second plastic part, 36 includes an outside diameter 38 that is cylindrical in shape and a rod bore 40 that is cylindrical in shape. The outside diameter 38 is sized to be slidably inserted into the cylinder bore 18.

The bearing 36 is retained in the cylinder barrel 12 by a plurality of blind rivets 42 that are circumferentially spaced around the cylinder barrel 12 and that are disposed radially inward toward the longitudinal axis 14.

A piston rod, or second tubular part, 44 of aluminum tubing includes an outside diameter 46, an inside diameter 48, an inner end 50, and an outer end 52. A piston, or third plastic part, 54 includes a cylindrical body 56 having an O-ring groove 58, and an attaching portion 60. The piston rod 44 is attached to the piston 54 by means of a plurality of blind rivets 62 that are circumferentially spaced and that are radially disposed.

An O-ring 64 provides a gas-tight seal between the piston 54 and the cylinder bore 18.

A first diametral clearance, or flow path, 66 exists between the rod bore 40 and the piston rod 44; and a second diametral clearance 68 exists between the outside diameter 38 of the cylinder bearing 36 and the cylinder bore 18 of the cylinder barrel 12.

Preferably, the rod bore 40 is sized to provide a predetermined restriction to the aspiration of a rod-end volume 70 that is disposed radially intermediate of the piston rod 44 and the cylinder bore 18 and longitudinally intermediate of the piston 54 and the cylinder bearing 36.

Preferably this predetermined restriction is achieved by a diametral clearance 68 of approximately 0.010 inches between the rod bore 40 and the piston rod 44.

The shock absorber 10 includes a head-end volume 72 that is disposed longitudinally intermediate of the cylinder head 26 and the piston 54. The head-end volume 72 is charged by means of an air valve, or charging valve, 74 that is threaded into a bore 76 of the cylinder head 26; and a hole 78 that communicates the bore 76 with the head-end volume 72.

A clevis 80 includes a clevis hole 82; and the clevis 80 is attached to the piston rod 44 by a weld 84.

The shock absorber 10 includes a mounting hole 86 that extends diametrally through both the cylinder barrel 12 and the cylinder head 26.

The shock absorber 10 includes a plastic disk 88 having an outside diameter 90 that is resiliently and retainably snapped into the circumferential groove 24 of the cylinder barrel 12, and having an inside diameter 92 that is larger than the rod bore 40 of the cylinder bearing 36.

The shock absorber 10 includes a filter disk 94 of plastic foam that is disposed longitudinally intermediate of the plastic disk 88 and the cylinder bearing 36, and that provides protection from entry of dirt into the rodend volume 70 through either the diametral clearance 66 or the diametral clearance 68.

Finally, an O-ring 96 is installed inside the cylinder barrel 12 intermediate of the cylinder bearing 36 and the piston 54; and the O-ring 96 functions as a mechanical bumper between the piston 54 and the cylinder bearing 36 when the piston rod 44 extends fully outward.

Preferably, all of the plastic parts are made from Ultra-High, a polyethylene, which is generally known as UHMW, and which is manufactured by the Polymer Corporation.

Figure 2:
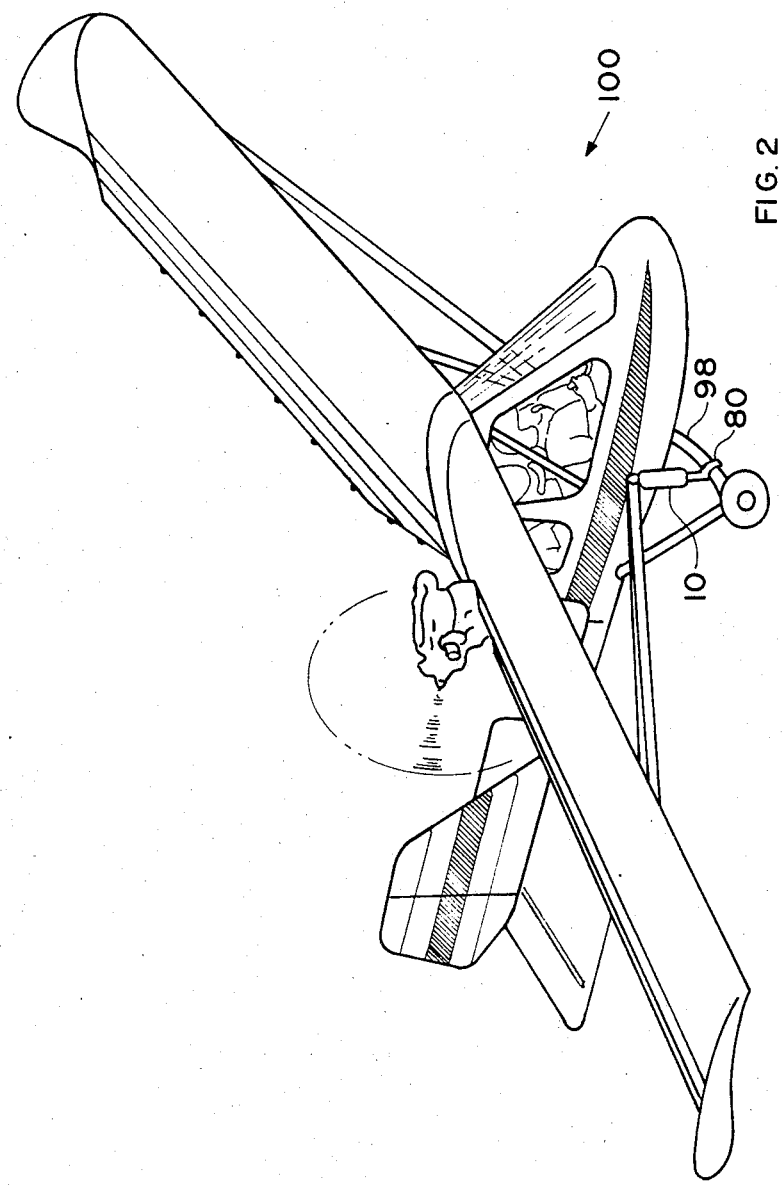
FIG. 2 is a perspective view of an ultralight airplane with a shock absorber of the present invention included in the landing gear.

Referring now to FIGS. 1 and 2, in operation, the shock absorber 10 is mounted to an aircraft landing gear 98 of an aircraft 100 with the clevis 80 generally pointing downwardly. Thus, the O-ring 96, that is used as a rubber bumper, rests against the cylinder bearing 36.

A small amount of oil, not shown, is inserted into the head-end volume 72 and rests both against the piston 54 and intermediate of the piston 54 and the cylinder bore 18, against, and upwardly from, the O-ring 64, thereby providing reliable lubrication for the cylinder bore 18, the piston 54, and the O-ring 64, all with a minimum quantity of oil.

Pressurizing the shock absorber 10 is by attaching a source of a gas, or air, to the charging valve 74. Preferably a tire pump (not shown) of a type operated by hand, by foot, or by a battery, is used to charge the shock absorber 10.

In a typical installation, the cross sectional area of the head-end volume 72 is approximately 4.43 square inches; and the weight of the aircraft, with pilot and fuel, is approximately four hundred fifty pounds. Using two of the shock absorbers 10 makes the charging pressure approximately fifty pounds per square inch.

In order to obtain the most favorable operation of the shock absorbers 10, it is desirable to vary the pressure in the shock absorbers 10 to the value that will maintain the shock absorbers 10 at fully extended stroke with the pilot sitting in the aircraft. Thus, if different pilots use the aircraft, it is desirable to change the charging pressure of the shock absorbers 10 in accordance with the weight of the individual pilot.

In summary, the present invention provides a reciprocating cylinder 102 that is fabricated from tubular parts, 12 and 44, and plastic parts, 26, 36, and 54, that are attached by blind rivets 32, 42, and 62.

When one of the volumes, 70 or 72, is aspirated to atmospheric air, as by the diametral clearance 66, and the flow path of aspiration is restricted, as by limiting the diametral clearance 66, the reciprocating cylinder 102 includes energy absorbing means that includes the flow path of the diametral clearance 66 and the diametral limitation thereof.

Preferably, as when the diametral clearance 66 is used both for the flow path 66 and the limiting of the flow path 66, the flow path 66 limits air flow both into and out of the rod-end volume 70; and so the air pressure in the rod-end volume 70 decreases when the piston rod 44 moves inwardly and increases when the piston rod 44 moves outwardly.

When one of the volumes, 70 or 72, is pressurized with a gas, which preferably comprises air, the reciprocating cylinder 102 becomes an air spring 104; and when the other of the volumes, 70 or 72, is aspirated to atmosphere, and the flow path of aspiration is restricted, the reciprocating cylinder becomes the shock absorber 10.

In summary, the present invention provides an economical shock absorber 10 for use with ultralight, and other aircraft of the pleasure-soaring type, by eliminating the need for a complicated damping valve.

Instead of using a complicated damping valve, the present invention aspirates the rod-end volume 70 to atmospheric air by way of the diametral clearance 66, and limits the flow path of aspiration in order to achieve damping.

In addition, the present invention achieves cost economies by utilizing aluminum tubing for both the cylinder barrel 12 and the piston rod 44, by eliminating machining operations that are typically required to provide surfaces for sliding seals, and by a reduction in the number of seals that are required.

A reliable device is provided by eliminating the need for a complicated damping valve and instead aspirating the rod-end volume 70, by eliminating the need for a sliding seal on the piston rod 44 and by attaching various parts with a plurality of blind rivets, such as rivets 42, that are installed into a plurality of circumferentially spaced and radially disposed holes, such as holes 106.

Finally, both ease of servicing the shock absorber 10 and an exceptionally effective device are achieved by designing with such low charging pressures that the charging pressure in the shock absorbers 10 can be adjusted to the weight of the individual pilot by means of a tire pump.

In addition to use with landing gears having wheels, the present invention is usable with either snow skiis or pontoons. When used with pontoons, the effectiveness of the present invention, a part of which is achieved by adjusting the charging pressure in accordance with the load, is especially effective in softening the effect of waves in a body of water.

Further, the present invention is effective in softening the effect of rough ground during taxiing, allowing higher taxiing speeds, reducing stresses on the airframe, and increasing pilot comfort.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

INDUSTRIAL APPLICABILITY

The present invention is applicable to aircraft commonly known as ultralight, and to aircraft of the light utility type.

What is claimed is:

1. A gas-actuated shock absorber for aircraft, which shock absorber comprises:
    a cylinder barrel having first and second ends, having a cylindrical outside surface, and having a cylinder bore;
    a cylinder head being dispsoed proximal to one of said ends of said cylinder barrel, and being operatively attached to said cylinder barrel;
    a bearing being disposed proximal to the other of said ends of said cylinder barrel, being operatively attached to said cylinder barrel, and having a rod bore;
    a piston rod having an inner end that is inserted through said rod bore, having an outer end, and being movable in both inward and outward directions;

means, comprising a piston that is inserted into said cylinder bore and that is operatively attached to said piston rod, for dividing said shock absorber into first and second volumes that are inversely variable by longitudinally positioning said piston rod and said piston;

means, comprising a valve, for charging one of said volumes with a gas;

energy absorbing means, comprising a flow path that aspirates the other of said volumes to atmospheric air, and comprising restriction of said flow path in one direction of air flow, for damping movement of said piston rod in one of said directions;

said shock absorber includes a diametral clearance that is disposed proximal to one of said ends of said cylinder barrel;

said flow path comprises said diametral clearance; and said restriction of said flow path in said one direction of air flow comprises restricting said flow path in the direction of atmospheric air flowing into said other volume; whereby said energy absorbing means comprises reducing pressure in said other volume below atmospheric pressure.

2. A gas-actuated shock absorber for aircraft, which shock absorber comprises:

a cylinder barrel having first and second ends, having a cylindrical outside surface, and having a cylinder bore;

a cylinder head being disposed proximal to one of said ends of said cylinder barrel, and being operatively attached to said cylinder barrel;

a bearing being disposed proximal to the other of said ends of said cylinder barrel, being operatively attached to said cylinder barrel, and having a rod bore;

a piston rod having an inner end that is inserted through said rod bore, having an outer end, and being movable in both inward and outward directions;

means, comprising a piston that is inserted into said cylinder bore and that is operatively attached to said piston rod, for dividing said shock absorber into first and second volumes that are inversely variable by longitudinally positioning said piston rod and said piston;

means, comprising a valve, for charging one of said volumes with a gas;

energy absorbing means, comprising a flow path that aspirates the other of said volumes to atmospheric air, and comprising restriction of said flow path in one direction of air flow, for damping movement of said piston rod in one of said directions;

said other volume is disposed intermediate of said cylinder bearing and said piston;

said attachment of said cylinder bearing to said cylinder barrel comprises inserting said cylinder bearing into said cylinder bore;

said shock absorber includes a first diametral clearance between said piston rod and said rod bore and a second diametral clearance between said cylinder bearing and said cylinder barrel; and said flow path comprises one of said diametral clearances.

3. A shock absorber as claimed in claim 2 in which said restricting of said flow path comprises limiting said one diametral clearance.

4. A shock absorber as claimed in claim 3 in which said cylinder barrel includes an internal groove that is disposed longitudinally outward from said bearing; and said shock absorber includes a plastic disk that is assembled over said piston rod and that is resiliently retained in said internal groove, and a filter disk that is disposed intermediate of said plastic disk and said cylinder bearing and that protects both of said diametral clearances from entry of foreign material.

5. A reciprocating cylinder, which reciprocating cylinder comprises:

a first tubular part having first and second ends, having a cylindrical outside surface, and having a cylinder bore;

a first plastic part being disposed proximal to one of said ends of said first tubular part, and being operatively attached to said first tubular part;

a second plastic part being disposed proximal to the other of said ends of said first tubular part, being operatively attached to said first tubular part, and having a rod bore;

a second tubular part having an inner end that is inserted through said rod bore and into said cylinder bore, having an outer end, and being movable in both inward and outward directions;

means, comprising a third plastic part that is inserted into said first tubular part and that is operatively attached to said second tubular part, for dividing said reciprocating cylinder into first and second volumes that are inversely variable by longitudinally positioning said second tubular part and said third plastic part; and said attaching of one of said plastic parts to one of said tubular parts comprises said one plastic part being inserted into said one tubular part, and a plurality of circumferentially spaced and radially disposed rivets extending radially through said one tubular part and into said one plastic part.

6. A reciprocating cylinder as claimed in claim 5 in which said operative attachment of said second plastic part to said first tubular part comprises said second plastic part being inserted into said first tubular part;

said first tubular part includes an internal groove that is disposed longitudinally outward from said second plastic part; and said reciprocating cylinder includes a plastic disk that is assembled over said second tubular part and that is resiliently retained in said internal groove, and a filter disk that is disposed intermediate of said plastic disk and said second plastic part.

7. A reciprocating cylinder as claimed in claim 5 in which said reciprocating cylinder includes energy absorbing means, comprising one of said volumes and comprising a gas, for damping movement of said second tubular part in one of said directions of movement.

8. A reciprocating cylinder as claimed in claim 5 in which said reciprocating cylinder includes energy absorbing means, comprising a flow path that aspirates one of said volumes to atmospheric air, and comprising restricting of said flow path in one direction of air flow, for damping movement of said second tubular part in one of said directions of movement.

9. A reciprocating cylinder as claimed in claim 8 in which said one volume comprises said first volume;

said first volume is disposed longitudinally intermediate of said second and third plastic parts and radially intermediate of said second tubular part and said cylinder bore;

said operative attachment of said second plastic part to said first tubular part comprises said second plastic part being inserted into said first tubular part;

said reciprocating cylinder includes a first diametral clearance between said second tubular part and said rod bore and a second diametral clearance between said second plastic part and said first tubular part;

said flow path comprises one of said diametral clearances; and said restricting of said flow path comprises limiting said one diametral clearance.

10. A reciprocating cylinder as claimed in claim 9 in which said first tubular part includes an internal groove that is disposed longitudinally outward from said second plastic part; and said reciprocating cylinder includes a plastic disk that is assembled over said second tubular part and that is resiliently retained in said internal groove, and a filter disk that is disposed intermediate of said plastic disk and said second plastic part and that protects both of said diametral clearances from the entry of foreign material.

11. A method for softening landings of aircraft, which method comprises:
(a) providing a cylinder barrel of tubing that includes first and second ends;
(b) closing one of said ends of said cylinder barrel;
(c) providing a piston rod of tubing;
(d) providing a plastic piston;
(e) securing said plastic piston to said piston rod;
(f) inserting said plastic piston and a proximal portion of said piston rod into the other end of said cylinder barrel;
(g) providing a plastic cylinder bearing;
(h) assembling said plastic bearing over said piston rod;
(i) securing said plastic bearing to said cylinder barrel proximal to said other end thereof;
(j) installing a charging valve which communicates with a first volume of said reciprocating cylinder that is variably adjusted by longitudinal movement of said plastic piston;
(k) pressurizing said first volume of said reciprocating cylinder with a gas;
(l) adjusting the pressure in said first volume in accordance with the loaded weight of said aircraft; and one of said securing steps comprises:
(m) inserting one of said plastic parts into one of said tubular parts;
(n) providing a plurality of circumferentially spaced and radially disposed holes that extend through said one tubular part and into said one plastic part; and
(o) inserting blind rivets into said holes.

12. A method as claimed in claim 11 in which said method comprises:
(a) providing a flow path between atmosphere and a second volume that is variably adjusted by longitudinal movement of said piston; and
(b) restricting said flow path in one direction.

13. A method as claimed in claim 12 in which:
(a) said attachment of said plastic bearing to said cylinder barrel comprises inserting said plastic bearing into said cylinder barrel;
(b) said method comprises providing a first diametral clearance between said piston rod and said rod bore and a second diametral clearance between said bearing and said cylinder barrel;
(c) said step of providing a flow path comprises said providing of one of said diametral clearances; and
(d) said step of restricting said flow path comprises limiting said one diametral clearance.

* * * * *